Feb. 24, 1931.  S. OTIS  1,793,508
MULTIPLE UNIT STORAGE FOR BOILER WASHING APPARATUS
Filed April 28, 1923
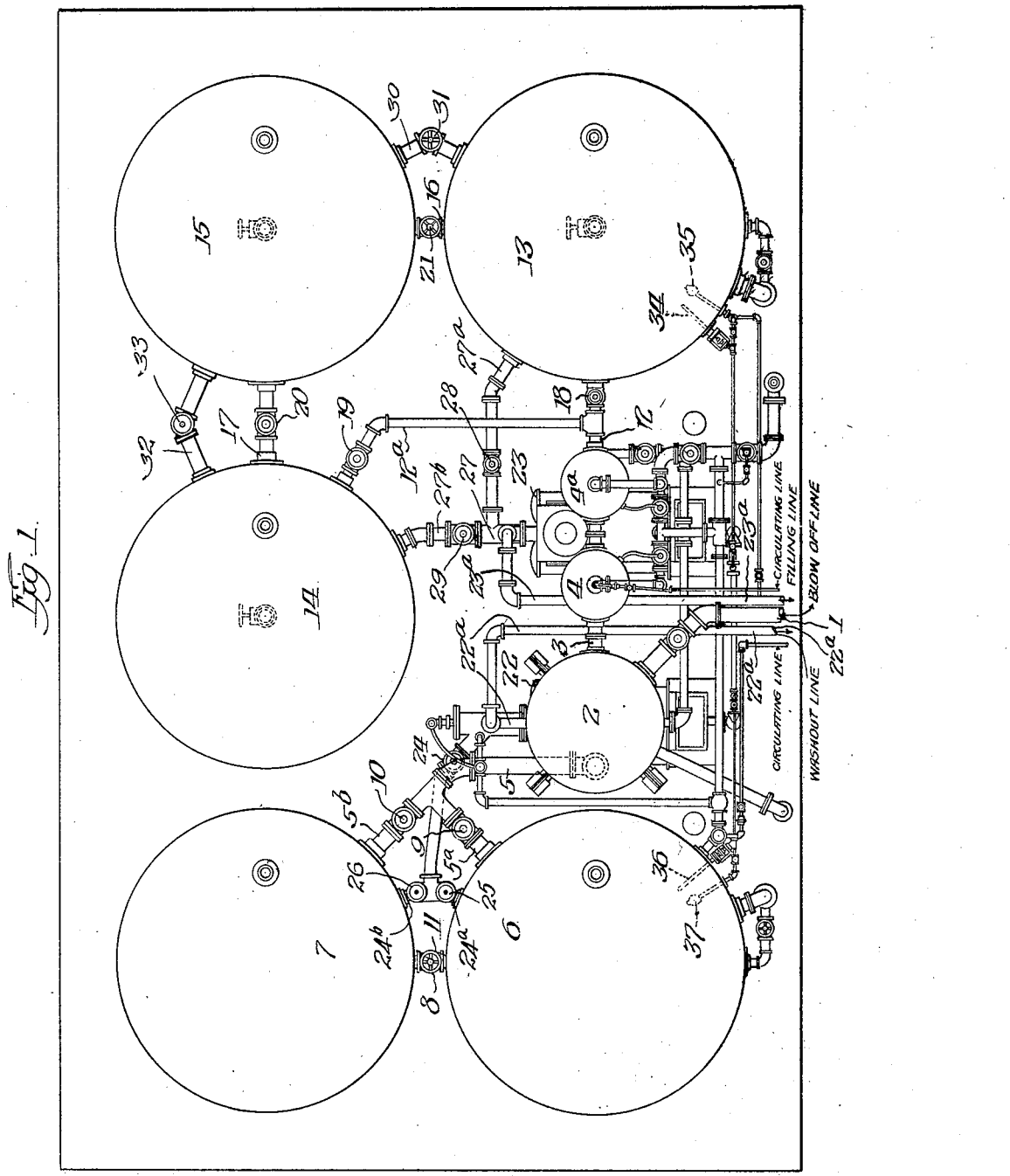
Witness:
Inventor:
Spencer Otis,
By Wilkinson, Huxley, Byron, Knight
Attys Patented Feb. 24, 1931

1,793,508

UNITED STATES PATENT OFFICE

SPENCER OTIS, OF BARRINGTON, ILLINOIS, ASSIGNOR TO THE LOCOMOTIVE TERMINAL IMPROVEMENT COMPANY, OF CHICAGO, ILLINOIS, A CORPORATION OF MAINE

MULTIPLE-UNIT STORAGE FOR BOILER-WASHING APPARATUS

Application filed April 28, 1923. Serial No. 635,215.

This invention relates to apparatus adapted to receive products blown off from steam boilers, for instance, locomotive boilers, and to separate such products into vapor which is condensed with clean water to produce a high temperature refilling supply, water which is conserved for the purpose of washing out boilers, and sludge, scale, or the like, which is discarded. Owing to the increase in the work demanded by plants of this kind, and the consequent increase of tank storage capacity that is required, construction of tanks of sufficient size has come to be a problem; expense incident to the discard of an existing tank and substitution of a larger tank to meet an increased demand on the existing tank involves very serious ineconomy; and when it becomes necessary to clean out a tank existing as a part of a boiler washing system it has heretofore been necessary to shut down the entire plant in some instances for as much as twenty-four hours, with consequent interruption of the work of keeping locomotives in proper running order. In addition to this, the relation of washout storage to refilling storage in an individual plant differs in different localities.

Moreover, with increase of storage capacity comes increased difficulty and ineconomy of temperature regulation, where single unit storage of each kind of water is attempted, and waste or inconvenience may be caused by arrival of blowoff products at a time when temperatures are already above normal in a tank, thus necessitating additional tempering water, or at a time when a single unit storage tank is below normal temperature, and the increment of hot water available from the blow-off would have little effect on the temperature of so large a body, thus necessitating consumption of live steam, whereas with proper subdivision of storage capacity into independent units available separately or collectively as occasion may require, any given unit or number of units may be selected for receiving blowoff products, supplying demand for washout or refill water, treatment to regulate temperature, or whatever operation may be required in the operation of the plant.

The present invention seeks to meet all of the foregoing conditions in an effective and economical manner by developing the tank storage for the washout water and refilling water of a boiler washing system in the form of a plurality of separate and independent units of a construction and size that can be standardized so that required capacity will be met by selecting the number of units necessary to equal the total capacity required. The invention includes the arrangement, equipment and relation of the several units of the tank storage whereby they will act largely as a single unit in the matter of internal circulation or heat distribution when they are all in use, and whereby each individual unit, or any number of the units less than the whole, may be utilized to the exclusion of the remainder, and any one or more of the units may be temporarily isolated and emptied before cleaning or repair.

The accompanying drawing shows a plan view of that portion of a boiler washing plant that has to do with receiving and separating the blown off products of a locomotive boiler, storing the constituents thereof that are to be saved, in the form of washout water and refilling water, effecting each of these two classes of storage in a plurality of tank units, delivering the stored water from any and all of the units to the respective supply lines, and controlling these several functions, as well as the functions of maintaining and regulating temperature.

1 represents the blowoff pipe leading from stalls of a locomotive roundhouse or other situation where it can be connected up with the locomotive boiler, contents of which are to be disposed of as a preliminary to washing out the boiler and refilling it. This blowoff pipe leads to a separator 2 where vaporous constituents of the blowoff pass through pipe 3 to the condensers 4, 4a, while the watery portion thereof escapes through pipe 5 and through branches 5a and 5b to the units 6 and 7 of the washout water storage element of the system. Units 6 and 7 are connected by a pipe 8 near the bottom, and the branch pipes 5a and 5b when open constitute a connection between them at a point substantially above the bottom so that circulation will be set up between the units and equalize the temperature of the water within them. Pipes 5a, 5b and 8 are adapted to be closed, respectively, by valves 9, 10, and 11 so that flow of water can be cut off from either of the units 6 and 7 when it is desired to clean or repair the same or if it be desired to deliver to one unit exclusively of the other or draw from one to the exclusion of the other. From condensers 4, 4a water of condensation passes by way of a pipe 12 to tank unit 13 of a filling supply, and through a branch 12a to the unit 14 of said supply. These units 13 and 14 may constitute end units of a series, of which any number of intermediate units represented by the tank 15 can be supplied through connecting pipes 16, 17, and, conversely, any such intermediate unit as well as either of the end units can be isolated from all the other units of the filling water storage by closing the appropriate valves 18, 19, 20, or 21; it being apparent that when either of the end units is isolated, flow of water to and from an intermediate unit or units will take place by way of the other end unit.

As the units of the two classes of storage capacity, for washing out and refilling, are adapted for individual and collective supply from the blown off products, so they are individually and collectively adapted to give back their stored water to the washout pump 22, and supplying line 22a, or refilling pump 23 and supplying line 23a, as the case may be; pipes 24a, 24b delivering to the suction pipe 24 of the washout pump 22 being connected with the washout tank units 6 and 7, and being provided with valves 25 and 26 for the purpose of isolating either of said units at will for purposes already referred to, while supply pipes 27a, 27b lead from the respective end units 13, 14 of the refilling supply to the suction pipe 27 of the filling pump 23; these last-named pipes being provided with valves 28 and 29 for the purpose of isolating them; and said end unit 13 having bottom connection 30 controlled by valve 31 between it and the intermediate section 15, while end unit 14 has connection 32 controlled by valve 33 between it and said intermediate unit.

In addition to the features above specifically enumerated, the system may, of course, have all of the adjuncts required for insuring the various functions incident to boiler washing systems of this type, including thermostat 34 controlling steam discharge 35 in one of the refilling water units to keep up the temperature of the latter, and thermostat 36 controlling steam discharge 37 in one of the units, for instance, unit 6 of the washout water storage for maintaining temperature thereof. The thermostatically controlled elements 35 and 37 are merely typical of temperature regulating devices, and they may be either steam or cold water as may be required. The connections between the tank units at different levels, as already described, adapt the system for the use of the temperature regulating means in one of the units and insures equalization of temperature throughout the storage space composed of all the units, or, with the controlled supply, drawoff, and connecting conduits, the units may be utilized selectively for storage, supply, or treatment of contained water at will.

I claim:

1. In a boiler washing apparatus, a blowoff pipe adapted to receive products blown off from the boiler, a delivery pipe adapted to return water to such boiler, and tank storage for receiving one kind of product delivered by the blowoff pipe and supplying water to the delivery pipe; said tank storage comprising a plurality of independent tank units, each having means through which it communicates with both said pipes, and each adapted to be cut off from both said communications.

2. In boiler washing apparatus, a blowoff pipe adapted to receive products blown off from a boiler, a delivery pipe adapted to return water to such boiler, and tank storage for receiving one kind of product delivered by the blowoff pipe and supplying water to the delivery pipe; said tank storage comprising a plurality of independent tank units, each having means through which it communicates with both said pipes and with the others of said units, and each adapted to be cut off from all of said communications.

3. In a boiler washing system, a series of tank units comprising end units collectively provided with connections for receiving and delivering one kind of water used in the system in the series and one or more units intermediate of the ends, all of said units being connected to establish circulation through them, and being provided with means for isolating any of said units from all the rest.

4. In a boiler washing system, a series of tank units comprising end units in the series and one or more units intermediate of the ends, all of said units being connected to establish circulation through them, and being provided respectively with valves for isolating any of said units from all the rest; said units being connected to receive one kind of water used in the system as well as to deliver the same; and valves being provided in the receiving connections and in the delivery connections of said units.

5. In a boiler washing system, a plurality of water storing tank units, and connections through which said units receive and deliver one kind of water used in the system, said connections being located at different levels and adapted to maintain internal circulation through the units with equalization of water temperature therein.

6. In a boiler washing system, a plurality of water storing tank units, and connections through which said units receive and deliver one kind of water used in the system, said connections being located at different levels and adapted to maintain internal circulation through the units with equalization of water temperature therein; means being provided for regulating the temperature of water in one of the units.

Signed at Chicago, Illinois, this 20th day of April, 1923.

SPENCER OTIS.